United States Patent [19]

Matson

[11] 3,714,326

[45] Jan. 30, 1973

[54] RECOVERY OF NICKEL AND COBALT FROM REDUCED NICKELIFEROUS ORES

[75] Inventor: Rapheal F. Matson, New Orleans, La.

[73] Assignee: Freeport Minerals Company, New York, N.Y.

[22] Filed: May 17, 1971

[21] Appl. No.: 144,415

[52] U.S. Cl. ................................................ 423/150
[51] Int. Cl. ......................... C01g 51/12, C01g 53/12
[58] Field of Search .................. 75/103, 119; 423/150

[56] References Cited

UNITED STATES PATENTS

| | | | |
|---|---|---|---|
| 2,576,314 | 11/1951 | Forward | 75/103 UX |
| 3,100,700 | 8/1963 | Hills | 75/119 X |
| 3,107,977 | 10/1963 | Bowdi et al. | 75/119 X |

*Primary Examiner*—Herbert T. Carter
*Attorney*—W. Philip Churchill

[57] ABSTRACT

In an ammoniacal leaching process for the recovery of nickel and cobalt from reduced nickeliferous ores, copper contamination of the product liquor may be minimized or substantially avoided by controlling oxidation of ore constituents during aeration of a slurry of reduced ore and leach liquor.

4 Claims, No Drawings

RECOVERY OF NICKEL AND COBALT FROM REDUCED NICKELIFEROUS ORES

BACKGROUND

This invention relates to a method for controlling and minimizing copper contamination in the product liquor obtained by leaching reduced nickeliferous ores with an ammoniacal solution in the presence of oxygen.

Various nickeliferous ores in their natural state contain substantial amounts of iron and smaller amounts of cobalt and copper in addition to nickel. Processes have been developed for the treatment of such ores in which the non-ferrous metals are readily separated from the substantial amount of iron in the ore. One well known process (which is described in U.S. Pat. No. 3,100,700, issued Aug. 13, 1963) involves the steps of heating the ore at elevated temperatures as in a roasting furnace under reducing conditions, cooling the reduced ore to a temperature of around 150°F. or lower without permitting re-oxidation, forming a slurry of the reduced ore in an aqueous, ammoniacal solution containing on the order of 6 percent of ammonia, half of which is present in the form of the hydroxide and the other half in the form of the carbonate, and aerating the slurry or pulp thus obtained.

The aeration supplies oxygen which, along with the water and ammonia, produces a reaction that converts the nickel, cobalt and copper present in the ore to soluble complex ammines. Simultaneously, the aeration oxidizes the reduced iron values in the ore to form insoluble ferric hydroxide. After filtration of the slurry, the product liquor, which contains the non-ferrous metal values, can be treated in various ways to recover those metals and also, if desired, to recover the ammonia for reuse.

When copper is not present in economically recoverable amounts in such ores, its dissolution in the product liquor along with the other non-ferrous metal values is highly undesirable because it constitutes a contaminant that must later be separated in some way from the desired metals. In the prior art processes, the aeration of the ammoniacal slurry has been carried out in one or more stages, but it has always been considered necessary to continue the aeration and agitation of the slurry for a long period of time in order to dissolve the maximum amounts of nickel and/or cobalt values. In so doing, most of the copper in the ore is also converted to a soluble form.

I have discovered that by a relatively simple control of the aeration step, it is possible to minimize, or even prevent, the solubilization of copper while still recovering the desired nickel and cobalt values in the ammoniacal liquor.

The advantage of my invention is that it permits the recovery of non-ferrous metals from nickeliferous ores without being contaminated by copper to such an extent that the copper has to be removed by expensive further processing.

SUMMARY OF THE INVENTION

According to my invention, the dissolution of copper during the leaching of reduced nickeliferous ores with an ammoniacal solution is minimized or prevented by carrying out the aeration of the slurry to the point where the slurry has a redox potential between about −200 and about −400 millivolts, as measured by a conventional calomel-platinum electrode pair and corrected to 25°C.

The redox potential of a slurry formed by mixing reduced nickeliferous ores with an aqueous ammoniacal solution containing about 6% of ammonia in the form of a mixture of ammonium hydroxide and ammonium carbonate is usually between −500 and −600 millivolts, before aeration, as measured by the calomel-platinum electrode pair and corrected to 25°C. As aeration of such a slurry proceeds, the redox potential gradually increases. As the slurry is gradually oxidized by the bubbling of air through it, the nickel and cobalt begin to dissolve by reason of the formation of complex nickel and cobalt ammines that are soluble in the ammoniacal solution. Oxidation also results in the gradual conversion of the iron values to ferric hydroxide which forms as a precipitate in the slurry.

I have found that at a redox potential below −400 millivolts, copper does not dissolve, but at the same time, the extraction or solution of nickel is poor. For good nickel recovery, it is necessary to aerate sufficiently to produce a redox potential above −400 millivolts.

If the redox potential is not allowed to reach −300 millivolts as the aeration and attendant oxidation continues, only trace amounts of copper dissolve and the resulting product liquor, after separation from the slurry, is virtually free of copper. As aeration is continued further, a slight amount of copper dissolves up to a redox potential of about −200 millivolts, but the resulting product liquor is still very low in copper. Above −200 millivolts, most of the copper will go into solution. Thus, in order to minimize the dissolution of copper, I have found that it is necessary to control the aeration or oxidation step so that the redox potential is maintained just below −200 millivolts. If even trace amounts of copper are to be avoided in the product liquor, the aeration of the slurry should be discontinued when a redox potential of −300 millivolts is reached.

I have further found that operation of the process in which the aeration is controlled so that the redox potential does not exceed −200 millivolts produces recovery of a high percentage of the nickel and cobalt values in the ore by converting them to soluble compounds that are dissolved in the product liquor. Thus, by my process, excellent recovery of nickel and cobalt values can be obtained free from any substantial contamination by copper.

Where a high cobalt recovery in the product liquor is sought, it is desirable to continue aeration to the point where the redox potential has risen to a value of −250 millivolts, or somewhat higher. Below a potential of −250 millivolts, cobalt extraction tends to be erratic. Thus, if the primary object is to recover nickel, aeration may be stopped at −300 millivolts, or at least before the potential has risen to −250 millivolts. On the other hand, where recovery of cobalt along with nickel is important, the better practice is to continue aeration until the redox potential rises to a value between −250 and −200 millivolts.

While specific values of redox potential have been given, expressed in terms of millivolts as measured by a calomel-platinum electrode pair and corrected to 25°C., it should be understood that any other means may be used to measure the redox potential of the slurry with equivalent results.

The particular temperature at which the oxidation of the slurry is carried out is not critical. However, aeration is seldom carried out as a practical matter at very low temperatures because of the impracticality of cooling the reduced ore any more than necessary when the slurry is formed. On the other hand, it is well understood in this process that the leaching should not be carried out at excessively high temperatures because of the attendant loss of volatile ammonia and the adverse effect on nickel recovery. Ammoniacal leaching of the reduced ores is commonly carried out at a temperature of the order of 40°C. (104°F.).

The specific values of redox potential given herein are independent of the original iron, cobalt, copper or nickel content of the ore. Therefore, a change in feed composition making up the slurry may affect the amount of air required for oxidation, but it will not affect the millivolt reading which is used as the guide to minimize dissolution of copper in the product liquor.

In the practice of the invention, measurement of the redox potential is made as the aeration of the slurry proceeds. When the aeration step is carried out in successive units on a continuous basis, the redox potential may be measured in each unit, although it is only necessary that the potential be measured in the last aeration unit of any series. The reason for this is that oxidation will have proceeded to a greater degree in the last aeration unit than in the earlier stages, so that the redox potential in the last unit is the one that really serves to control the process according to my invention.

The present invention may be applied to the recovery of nickel from reduced sulfide ores as well as reduced oxide ores, although its principal application is with iron-bearing, nickeliferous ores of the oxide type that contain nickel, with or without cobalt, and relatively small amounts of copper.

The reduced ore is subjected to ammoniacal leaching and any ammoniacal leaching liquor that is known to be suitable for dissolving nickel and cobalt values may be used. While aqueous solutions containing about 6 percent ammonia, partly in the form of hydroxide and partly as carbonate, are recognized as particularly satisfactory for this purpose, these particular concentrations of ammonium hydroxide and carbonate in the liquor are not critical in the operation of my process.

The following example is illustrative of the manner in which the present process may be operated to extract nickel and cobalt from reduced oxide ore. All percentages in the example below are by weight unless otherwise specified.

EXAMPLE

Reduced oxide are containing 1.8 percent nickel, 0.15 percent cobalt, 0.02 percent copper and 25 percent iron was quenched with an ammonia-ammonium carbonate solution (70 grams per liter total ammonia, 20 grams per liter free ammonia) and oxidized in one aerating tank with agitation under ambient pressure at 40°C. As aeration progressed, the millivolt potential and concentrations of copper, nickel, and cobalt in the solution were measured and recorded by conventional means. Millivolt potentials were measured from −400 to −100 with a calomel-platinum electrode pair and corrected to 25°C. with a built-in temperature compensator. The results appear in chart form below.

| Redox Potential | −100 mv | −200 mv | −300 mv | −400 mv |
|---|---|---|---|---|
| Copper in Solution | 0.082 | 0.054 | 0.005 | 0.001 |
| % Nickel Extracted | 87 | 87 | 87 | 87 |
| % Cobalt Extracted | 67–70 | 67–70 | 55–70 | 35–70 |

Nickel extraction was not affected over the millivolt range covered and cobalt extraction became consistent between about −300 and about −200 millivolts. As long as the redox potential remained below −200 millivolts, the solubilization of copper into the leach liquor was sufficiently inhibited so as to render later separation thereof unnecessary.

As is apparent from the above example, the method of this invention eliminates the need for copper removal operations in the ammoniacal leaching process for the extraction of nickel and cobalt from nickeliferous ores. In addition, the invention provides added flexibility in its application since the method can be adapted to meet different process requirements and is independent of process conditions.

Having described this invention and discussed several embodiments, and exemplifications thereof, it is not intended that this invention be limited by any of the details of description unless otherwise specified but rather be construed broadly within its spirit and scope as set out in the accompanying claims.

What is claimed is:

1. In a process of recovering non-ferrous metal values from nickeliferous ores containing copper as a contaminant in which the ore in a reduced condition is subjected to leaching with an ammoniacal liquor and the slurry formed is aerated in order to recover non-ferrous metal values in a solubilized form in the leach liquor, the improvement for selectively minimizing solubilization of copper values in the leach liquor which comprises carrying out the aeration of the slurry only to the point where the redox potential in said aerated leach liquor is between about −200 and −400 millivolts, as measured by a calomel-platinum electrode pair and corrected to 25°C.

2. The process as defined in claim 1 wherein aeration is continued until the redox potential in said aerated leach liquor reaches a value between about −250 and about −200 millivolts, as measured by a calomel-platinum electrode pair and corrected to 25°C., aeration is then dis-continued, and the leach liquor is separated from the slurry.

3. The process as defined in claim 1 in which nickel and cobalt are the non-ferrous metals in the ore that are recovered in the leach liquor free from substantial contamination by copper.

4. The process as defined in claim 3 in which aeration is continued until the redox potential rises to −300 millivolts as measured by a calomel-platinum electrode pair and corrected to 25°C., aeration is then discontinued, and the leach liquor is separated from the slurry.

* * * * *

PO-1050
(5/69)

UNITED STATES PATENT OFFICE
CERTIFICATE OF CORRECTION

Patent No. 3,714,326      Dated January 30, 1973

Inventor(s)     Rapheal F. Matson

It is certified that error appears in the above-identified patent and that said Letters Patent are hereby corrected as shown below:

Column 3, line 56, "are" should be -- ore --;

Column 4, line 7, in the chart, before "copper" insert -- % --.

Signed and sealed this 3rd day of July 1973.

(SEAL)
Attest:

EDWARD M. FLETCHER, JR.      Rene Tegtmeyer
Attesting Officer            Acting Commissioner of Patents